Oct. 30, 1962     K. RITTER     3,060,898
HYDRAULIC POWER ASSEMBLY
Filed June 10, 1959     4 Sheets-Sheet 2
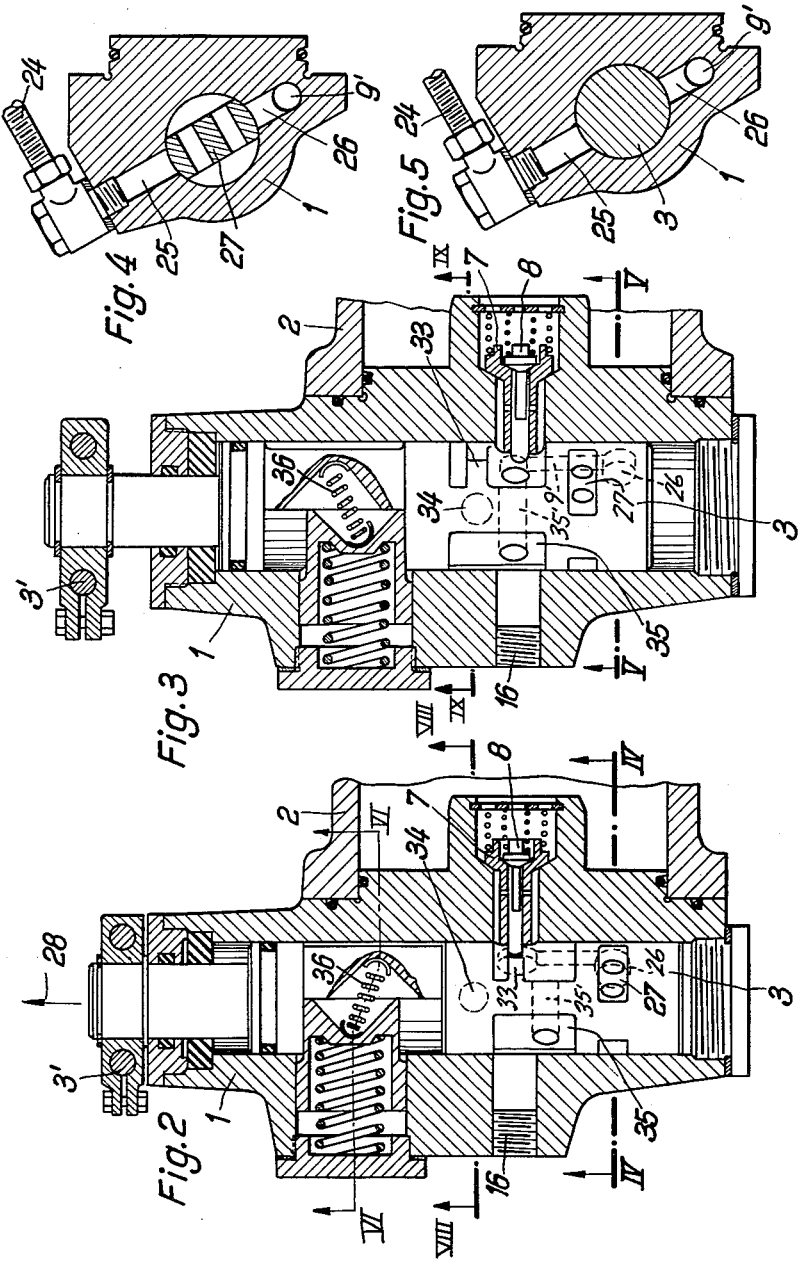
Inventor:
Kaspar Ritter Oct. 30, 1962 K. RITTER 3,060,898
HYDRAULIC POWER ASSEMBLY
Filed June 10, 1959 4 Sheets-Sheet 3

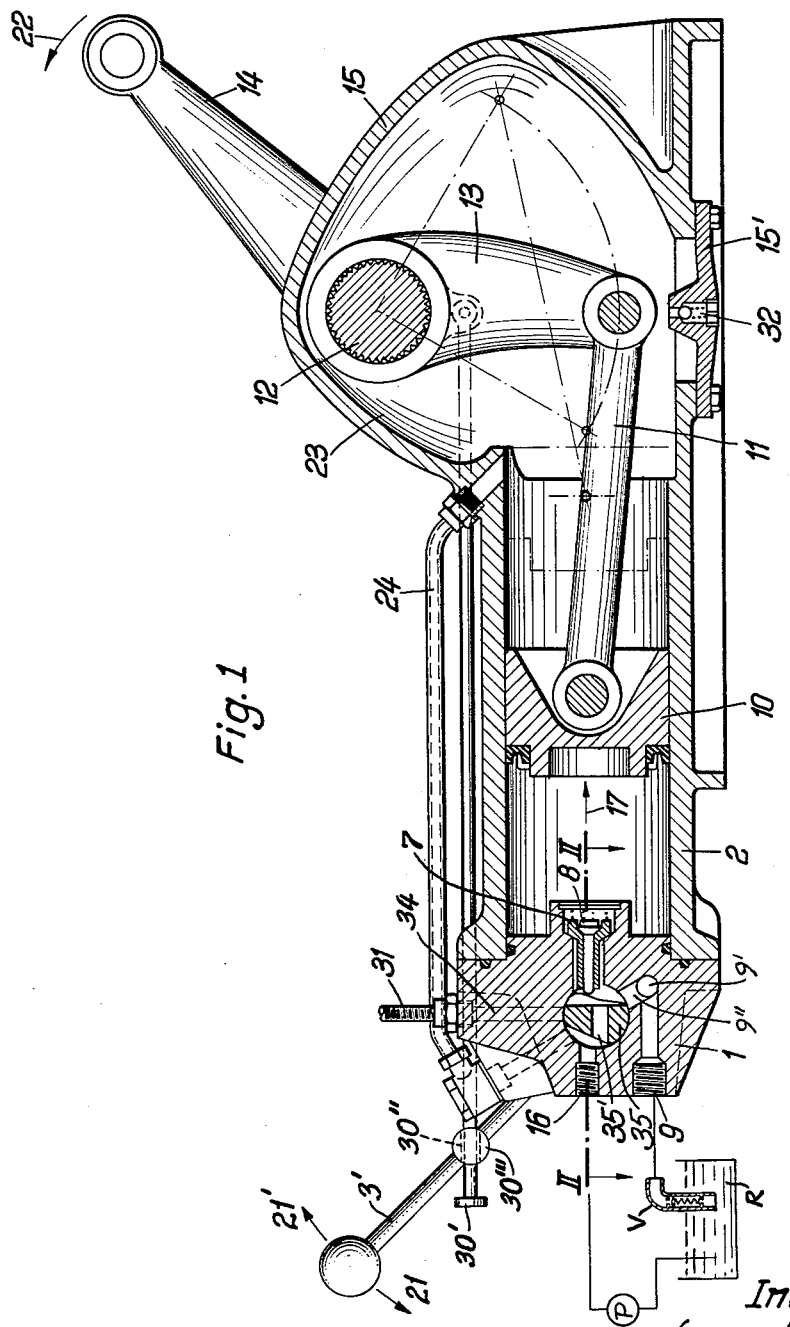

INVENTOR.
Kaspar Ritter
BY Michael S. Striker
Attorney

Oct. 30, 1962

K. RITTER 3,060,898

HYDRAULIC POWER ASSEMBLY

Filed June 10, 1959

INVENTOR.
Kaspar Ritter
BY Michael S. Striker
Attorney

United States Patent Office 3,060,898
Patented Oct. 30, 1962

3,060,898
HYDRAULIC POWER ASSEMBLY
Kaspar Ritter, Kirchheim, Teck, Germany, assignor to Allgaier-Werke G.m.b.H., Uhingen, Württemberg, Germany
Filed June 10, 1959, Ser. No. 819,273
7 Claims. (Cl. 121—40)

The present invention relates to hydraulic power assemblies.

More particularly, the present invention relates to hydraulic power assemblies of the type which are adapted to be used with tractors, for example, in order to operate auxiliary equipment associated with a tractor which is used on a farm, for example.

With hydraulic assemblies of this type it is conventional to provide a means for hydraulically moving a crank, for example, so as to lift a desired object, for example. The hydraulic structure is conventionally so designed that the fluid under pressure can be directed toward only one face of the piston of the hydraulic unit, and it is therefore possible to continue to advance the piston if an outside force acts on a crank so as to move the latter in the lifting direction, for example. Thus, in a situation, for example, where a unit of the type above has been actuated to raise an object and the tractor travels so as to transport the object while it is held raised by the hydraulic unit, it may happen that the tractor may encounter a hole in the road which would cause a sudden lowering of the tractor and engagement of the object being transported with the ground in a manner which would raise the crank structure beyond the point to which it has been moved by the piston, and under these circumstances considerable damage may be done.

Of course, it has already been proposed to provide for devices of the above type suitable structures which will block the piston and crank structure associated therewith so that they cannot move under conditions such as those described above. However, the conventional structures for this purpose have several disadvantages. On the one hand, they are extremely complex, and on the other hand, it is necessary when using such devices to locate the piston and crank structure joined thereto in a particular position which enables the blocking structure to block the movement of the piston and crank structure.

One of the objects of the present invention is to provide a hydraulic power assembly of the above type which is capable of blocking the movement of a piston and crank structure of the assembly with an exceedingly simple valve arrangement.

Another object of the present invention is to provide a hydraulic power unit of the above type which is capable of blocking the piston and crank structure in any desired position rather than in fixed predetermined positions.

It is also an object of the present invention to provide a structure of the above type which will automatically block movement of the piston and crank structure joined thereto when the piston has reached the end of its stroke so as to avoid the possibility of damage to the housing of the hydraulic assembly by striking of the crank structure against this housing.

An additional object of the present invention is to provide an assembly of the above type which is capable of being placed in a position which blocks further operation of the hydraulic power assembly while at the same time enabling a valve structure thereof to be used for controlling additional devices.

With the above objects in view the present invention includes in a hydraulic power assembly of the type referred to above a crank case and a cylinder fixed to and extending from the crank case communicating therewith. A piston is slidable in the cylinder and is operatively connected with a crank means which is housed in the crank case. A valve means communicates with the interior of the cylinder at the side of the piston which is directed away from the crank case, and a conduit means extends from the interior of the crank case to this valve means, the latter being movable in one direction from a neutral position to introduce fluid through this conduit means from a pump P under pressure into the cylinder to advance the piston toward the crank case in order to actuate the crank means, and the valve means is also movable in an opposite direction, from its neutral position, to free the fluid in the cylinder on the side of the piston opposite from the crank case for movement out of the cylinder and to refill the crank case along the above conduit means at the same time. A second valve means is operatively connected with the above valve means to automatically block the conduit means whenever the first-mentioned valve means is in its neutral position so that in this way the movement of the piston and the crank means connected thereto is automatically blocked by the hydraulic fluid on opposite sides of the piston whenever the first-mentioned valve means is in its neutral position.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1 is a partly schematic, partly fragmentary, sectional elevation of a hydraulic power assembly constructed according to the present invention, the sectional plane of FIG. 1 being taken along the axis of the hydraulic assembly;

FIG. 2 is a fragmentary transverse section of the valve structure of the invention showing the valve in one operating position thereof;

FIG. 3 shows the structure of FIG. 2 with the valve in a second operating position;

FIG. 4 is a sectional view taken along line IV—IV of FIG. 2 in the direction of arrows;

FIG. 5 is a sectional view taken along line V—V of FIG. 3 in the direction of the arrows;

Figure 6:
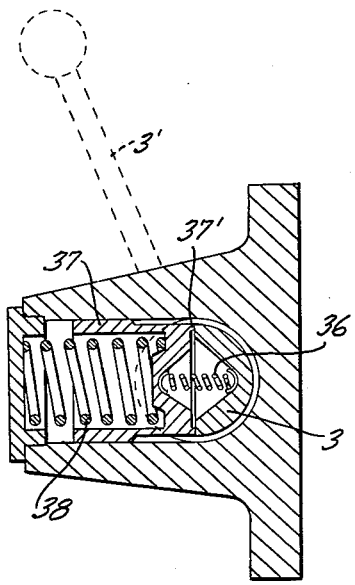
FIG. 6 is a fragmentary section taken along line VI—VI of FIG. 2 is the direction of the arrows.
Figure 7:
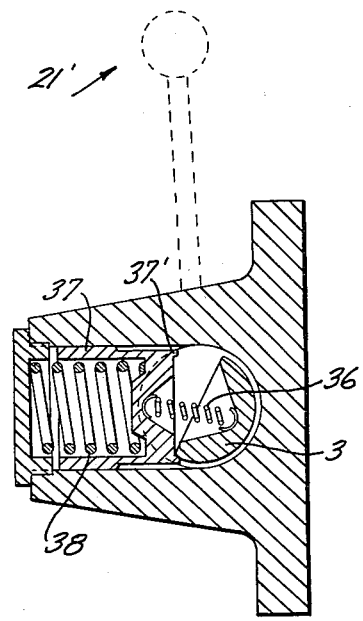
FIG. 7 shows the structure of FIG. 6 in a different position.

Referring now to the drawings, there is shown in FIG. 1 a hydraulic power assembly which includes the elongated cylinder 2 which has a left working end and a right crank end, as viewed in FIG. 1. A valve housing 1 is fixed fluid-tightly to the left working end of the cylinder 2 and closes the latter at its left end, as viewed in FIG. 1, the valve housing 1 forming part of a valve means of the invention as described below. This valve housing 1 is formed with a bore extending therethrough in a direction perpendicular to the plane of FIG. 1, and within this bore is housed the valve member 3 the details of which are shown most clearly in FIGS. 2 and 3. The valve housing 1 is formed with a pressure passage 16 leading to the chamber which accommodates the valve 3 and provided with fluid by the pump P, as shown schematically in FIG. 1, the suction side of the pump P communicating with a reservoir R shown in FIG. 1. The return-passage 9 runs by way of a relief-valve V also to the reservoir R and communicates in turn with the passages 9' and 9", the latter also communicating with the interior of the housing 1 at the part thereof which accommodates the valve member 3. Furthermore, the valve housing 1 carries a two-stage valve 7, 8 which is a non-return valve which closes off the working end of the cylinder 2 when this non-return valve 7, 8 is in its closed position, the valve member 3 including a camming portion 33 (FIG. 2) which cooperates with the two-stage non-return valve 7, 8 for opening the latter for a purpose described below.

The cylinder 2 has a piston 10 slidable in the cylinder 2 in a fluid-tight manner, and when fluid under pressure is introduced into the working end of the cylinder 2, this fluid under pressure acts on the piston 10 to advance the latter in the direction of the arrow 17 of FIG. 1. The piston 10 is connected through a connecting rod 11 with a crank means 12, 13, this crank means including in addition to the connecting rod 11 the crank arm 13 as well as the shaft 12 which is supported for rotation about its axis by the crank case 15, the shaft 12 being fluid-tightly supported by the crank case 15 and having a portion extending to the exterior of the crank case 15 where the shaft 12 is fixed to a second crank arm 14. Thus, the parts 11—14 form a crank means operatively connected to the piston 10 to be actuated thereby for producing the desired work by movement of the free end of the crank arm 14 in the direction of the arrow 22 shown in FIG. 1. For example, when the piston 10 is advanced in the direction of the arrow 17 of FIG. 1, the crank arm 14 will turn in the direction of arrow 22 in order to lift a desired object.

The valve member 3 extends fluid-tightly from the interior of the valve housing 1 to the exterior thereof where the valve member 3 is fixedly connected with an operating handle 3' accessible to the operator. The valve member 3 is illustrated in FIG. 1 in a neutral angular position thereof. From this neutral position the handle 3' can be turned either in the direction of the arrow 21 or in the direction of the arrow 21' in order to optionally introduce fluid under pressure from the passage 16 into the cylinder 2 at the left end of the latter, as viewed in FIG. 1, or to release fluid in the cylinder 2 for movement out of the latter through the left end thereof, as viewed in FIG. 1, so as to permit the piston 10 to be returned to the left, as viewed in FIG. 1, to a starting position by the force of a weight hanging or otherwise connected to the arm 14 and urging the latter in a direction opposite to the arrow 22 of FIG. 1. Thus, as may be seen from FIG. 1, when the handle 3' is turned slightly in the direction of the arrow 21, the part 35 of the valve 3 will block the passage 9" so that the fluid under pressure will be pumped from the pump P through the passage 16 into the interior of the housing 1, and this fluid under pressure has a force great enough to automatically open the non-return valve 7, 8 and thus enter into the cylinder 2 to advance the piston 10 in the direction of arrow 17. On the other hand, when the handle 3' is turned in the direction of arrow 21', shown in FIG. 1, the return passage 9", 9 remains communicating with the passage 16 through the opening 35' in the part 35 of the valve member 3, so that no high pressure can be built up, while the camming portion 33 will actuate the non-return valve 7, 8 to open the latter, and at this time the fluid within the cylinder 2 at the left of the piston 10, as viewed in FIG. 1, can flow through the non-return valve to the passage 9", 9'.

In order to block the crank arm 14 in whatever position it has been moved to by operation of the above-described structure, the crank case 15 is permanently maintained filled with hydraulic fluid such as oil. This crank case 15 is very sturdily built so that it can withstand pressures on the order of 50 atmospheres, for example. In order to make the crank case 15 strong enough to withstand such pressures without resorting to extremely heavy structure, this crank case is given the configuration illustrated in FIG. 1 where it has substantially the configuration of part of a sphere, so that without being too heavy and without having a wall which is too thick the crank case 15 nevertheless can withstand extremely high pressures. The cank case 15 is provided with a cover 15' carrying a safety valve 32 designed to yield when the pressure of the fluid within the crank case 15 exceeds the pressure for which the crank case is designed, such as the 50 atmospheres referred to above.

A conduit means communicates with the interior 23 of the crank case 15 in order to lead the hydraulic fluid into and out of the crank case 15, and this conduit means includes the conduit 24 shown connected to the crank case 15 in FIG. 1. The other end of the conduit 24 is shown in FIGS. 4 and 5 communicating with the passage 25 formed in the valve housing 1. This passage 25 leads to the chamber of the valve housing 1 which rotatably accommodates the valve member 3, and the valve member 3 has a valve portion 27 which cooperates with the passage 25 in a manner shown in FIG. 4. It will be noted from FIGS. 2 and 3 that the valve portion 27 of the valve member 3 is axially spaced from the valve portion 35 which cooperates with the passage 9". The configuration of the valve portion 35 is evident from FIG. 1 from which it is evident that the valve portion 35 is formed with a bore 35' passing therethrough. The valve portion 27 has a pair of bores passing therethrough, as shown in FIG. 4. The valve housing 1 is also formed with a passage 26 aligned with the passage 25 and leading to the passage 9' which extends from the passage 26 up to the passage 9" shown in FIG. 1, this passage 9' also communicating with the passage 9 which is connected with the fluid reservoir R, as illustrated in FIG. 1. The fluid in the low pressure conduits 9, 9', 9" is preferably maintained at a relatively low counterpressure. When the valve member 3 is in the neutral angular position thereof illustrated in FIG. 1, the portion 27 of the valve member 3 is in the angular position illustrated in FIG. 4 blocking communication between the passages 25 and 26 and thus preventing fluid from flowing in either direction along the conduit 24 to or from the interior 23 of the crank case 15, so that whenever the valve member 3 is in its neutral position the conduit 24 is blocked and the fluid in the crank case 15 cannot move into or out of the same and therefore the piston 10 and the crank means 11—14 is reliably held in whatever position it happens to be at this time. Thus, with the structure of the invention it is a very simple matter to block the piston 10 and the crank means 11—14 to prevent movement of the latter in either direction simply by placing the valve 3 in its neutral angular position illustrated in FIGS. 1 and 4.

Thus, in this neutral position of the valve member 3, the piston 10 and crank means 11—14 is blocked so that the crank arm 14 cannot be turned in the direction of the arrow 22 of FIG. 1. When the handle 3' is turned in the direction of the arrow 21 the valve portion 35 will close the passage 9" so that at this time the pump P will pump fluid from the reservoir R through the passage 16 and the non-return valve 7, 8 into the cylinder 2 to advance the piston 10 in the direction of the arrow 17 of FIG. 1, the piston 10 displacing the fluid at this time from the interior 23 of the crank case 15 along the conduit 24 and through the passages 25 and 26 into the passage 9' and from the latter through the passage 9 into the reservoir R. It will be noted that a relatively slight turning of the valve portion 27 in either direction from the neutral position illustrated in FIG. 4 will serve to place the passages 25 and 26 in communication with each other. When the handle 3' is turned in the direction of the arrow 21', the non-return valve 7, 8 and the passage 9" are both opened, so that the pump simply circulates the fluid without producing high pressure, and at this time the fluid in the cylinder 2 at the left of the piston 10, as viewed in FIG. 1, flows through the non-return valve which is opened by the cam 33 into the passage 9''', from the latter along the passage 9' to the passage 26, and from the latter through the passage 25 and the conduit 24 back into the interior 23 of the crank case 15. At this time, the piston 10 is urged to the left, as viewed in FIG. 1, by the load which is connected to the crank arm 14 and urges the latter in a direction opposite to the arrow 22. In the neutral position of the valve shown in FIG. 1, the pump P also circulates the hydraulic fluid through the passage 16, the bore 35', the passage 9''', and the passage 9 back to the reservoir R so that the fluid simply circulates at this time.

The above-described structure operates in the manner set forth above when the valve 3 is in the axial position thereof illustrated in FIG. 2. It is possible to shift the valve 3 axially in the direction of the arrow 28 shown on the top of FIG. 2 from the position of FIG. 2 to the second operating position of the valve 3 which is illustrated in FIG. 3. In the position of the valve 3 which is shown in FIG. 3, the cam 33 has been displaced axially from the non-return valve 7, 8 so that the latter will not be operated when the valve 3 is turned about its axis, and furthermore, a solid portion of the valve member 3 adjacent its lower end, as viewed in FIG. 3, becomes aligned with the passages 25 and 26, as shown most clearly in FIG. 5, so that at this time although the valve 3 is turned about its axis the passages 25 and 26 will never communicate with each other, and thus when the valve 3 has been shifted to its second operating position illustrated in FIG. 3 the piston 10 and the crank means 11—14 are blocked irrespective of the angular position of the valve 3. Thus, it is not essential to place the valve 3 in its neutral position in order to block the piston and crank means. Placing of the valve 3 in its neutral position when the valve 3 is in the axial position illustrated in FIG. 2 will block the piston 10 and the crank means 11—14. However, it is possible at any time to shift the valve 3 axially to the position of FIG. 3 and thus block the piston 10 and the crank means 11—14 irrespective of the particular angular position of the valve 3.

Figure 8:
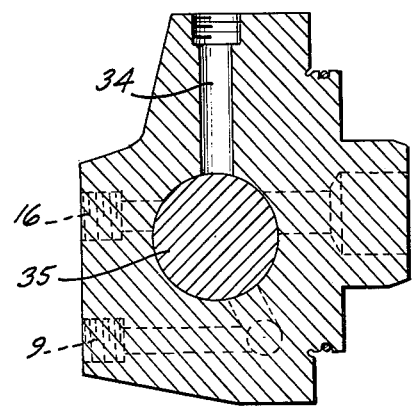
FIG. 8 is a sectional view taken along the line VIII—VIII of FIG. 2 in the direction of the arrows.
Figure 9:
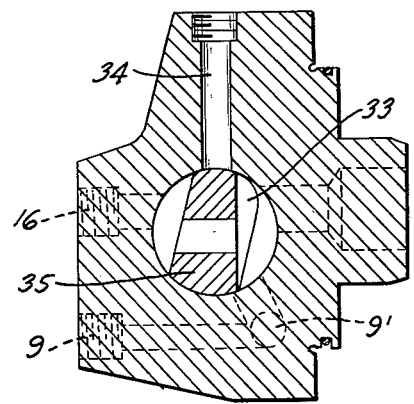
FIG. 9 is a sectional view taken along the line X—IX of FIG. 3 in the direction of the arrows.

When the valve 3 is in the axial position thereof shown in FIG. 3, it may be used for controlling another hydraulic structure which is connected to the valve housing 1 through the conduit 31 illustrated in FIG. 1. As is apparent from FIG. 1, as well as FIGS. 2 and 3, the conduit 31 communicates with a passage 34 which communicates with the interior of the valve housing 1 at the part of the latter which accommodates the valve 3 (FIGS. 8 and 9). In the position of the valve 3 shown in FIGS. 2 and 8, a solid circular portion of the valve 3 covers the passage 34 so as to maintain the latter closed irrespective of the angular position of the valve 3, while when the valve 3 is in a position shown in FIGS. 3 and 9, the valve portion 35 of the valve 3 cooperates with the passage 34 to control the flow of hydraulic fluid therethrough, this hydraulic fluid flowing from the pressure passage 16 into the passage 34 when the valve 3 is properly positioned and flowing from the passage 34 to the discharge 9 in another position of the valve 3, so that at this time with the piston 10 and crank means 11—14 effectively blocked it is possible to operate with the valve 3 another hydraulic structure connected to the conduit 31. Of course, it is also possible to operate more than one hydraulic structure with the valve 3 if this plurality of hydraulic structures are connected through the conduit 31 and passage 34 to the valve 3.

When the valve 3 is in the axial operating position thereof illustrated in FIG. 2, it is possible through carelessness to continue to advance the piston 10 in the direction of arrow 17 of FIG. 1 until the crank means strikes against the crank case 15 so as to accidentally damage the structure. In order to prevent such damage from taking place or to make stop the arm 14 in a predetermined position, a means is provided for automatically placing the valve 3 in its neutral angular position when the piston 10 reaches the end of its stroke illustrated in dot-dash lines in FIG. 1, or in another preset position. For this purpose, the shaft 12 is pivotally connected at the exterior of the crank case 15 to one end of a rod 30 which passes freely through an opening 30'' of a pin 30''' fixedly carried by the rod 3', this rod 30 having at its left end, as viewed in FIG. 1, a collar 30' fixed thereto in any suitable way. It should be noted that the play of the rod 30 in the opening 30'' as well as at the connection of the rod 30 to the shaft 12 is sufficiently great so as not to provide any resistance to the axial movement of the valve 3 between the positions thereof illustrated in FIGS. 2 and 3. The position of the collar 30' is such that when the piston 10 has advanced to the dot-dash line position thereof shown in FIG. 1, the shaft 12 will have turned in a counterclockwise direction, as viewed in FIG. 1, beyond the position of FIG. 1 through a distance sufficient to have placed the collar 30' in engagement with the pin 30''' so as to turn the handle 3' to the position thereof illustrated in FIG. 1. Of course, when the piston 10 advances to the right, as viewed in FIG. 1, in the direction of arrow 17 the handle 3' has been turned in the direction of the arrow 21 so as to close the passage 9'' to permit the fluid under pressure which enters through the passage 16 to entering to the cylinder 2, so that it is only necessary to turn the handle 3' in a clockwise direction, as viewed in FIG. 1, back to the position illustrated in FIG. 1. When the handle 3' is in the opposite direction, which is to say when it has been turned in the direction of arrow 21', the valve 7, 8 is open and the piston 10 simply returns to its rest position without any danger of injury to the structure.

It will also be noted that the opening of the conduit 24 into the crank case 15, as illustrated in FIG. 1, is located at the crank end of the cylinder 2 so as to be closed by the piston 10 itself when the latter reaches the dot-dash line position shown in FIG. 1, so that the piston 10 at this time acts as a valve closing the conduit 24 when the piston 10 has reached the end of its stroke illustrated in dot-dash lines in FIG. 1. In this way, the piston 10 itself acts to prevent further hydraulic fluid from flowing from the interior 23 of the crank case 15 along the conduit 24 through the valve means 1, 3 into the interior of the cylinder 2 at the side of the piston 10 directed away from the crank case 15, and thus this arrangement also serves as a safety structure to prevent further movement of the piston 10 beyond the position shown in dot-dash lines in FIG. 1 and thus also guarantees that there will be no injury to the structure.

As was pointed out above, when the valve 3 is in the position of FIG. 3, it may be turned about its axis to operate one or more hydraulic structures connected to the conduit 31, and thus it is necessary to turn the valve 3 about its axis when it is in the second operating position thereof illustrated in FIG. 3. Therefore, before shifting the valve 3 to the position of FIG. 3, the operator should be careful to make sure that the valve 10 is not at the end of its stroke illustrated in dot-dash lines in FIG. 1, since at this time the collar 30' is in engagement with the pin 30''' and it will not be possible to turn the rod 3' in the direction of arrow 21. Therefore, before shifting the valve 3 from the position of FIG. 2 to that of FIG. 3, the operator should see to it that the piston 10 is in an intermediate position where the collar 30 is spaced to the left of the pin 30''', as viewed in FIG. 1, by distance sufficient to provide the desired range of angular movement of the handle 3' in the direction of arrow 21 of FIG. 1.

The safety valve 32 may be rendered adjustable in any known way so as to provide the desired pressure at which fluid will be released from the interior 23 of the crank case 15.

A means is provided for releasably holding the valve 3 in the operating positions thereof illustrated in FIGS. 2 and 3. This means includes the coil spring 36 which has one end extending into a recess of the valve 3, this recess being of rectangular pyramidal configuration and having a rounded apex, while the coil spring also extends into a similarly shaped recess of a spring-pressed member 37, as shown in FIGS. 2, 3, 6, and 7. The member 37 is slidable in a bore of the valve housing 1 which extends radially with respect to the bore of the housing which receives the valve 3, and the spring 38 urges the member 37 radially toward the axis of the valve member 3. This spring 36 in cooperation with the pyramidal recesses formed in elements 3 and 37, respectively, acts in a manner similar to a toggle switch so that when the valve 3 is in a position of FIG. 2 the spring 36 yieldably holds the valve 3 in the axial position illustrated in FIG. 2, while when the valve 3 is in the position of FIG. 3, the spring 36 has snapped over to the position shown in FIG. 3 to hold the valve 3 in the position thereof shown in FIG. 3. As is evident from FIGS. 6 and 7, the member 37 is provided with a pair of ribs 37' which are parallel to each other and which engage the surface of the valve 3 which is directed toward the member 37, in the manner illustrated in FIG. 6. It will thus be seen that the spring 38 and member 37 act on the valve 3 in the position of the latter shown in FIG. 6 to yieldably urge the valve 3 to its neutral position. When the valve 3 has been turned in the direction of the arrow 21', for example, from the neutral position of FIG. 6 to that of FIG. 7, the lower rib 37', as viewed in FIG. 7, has moved beyond the lower edge of the valve 3 to engage the latter in the manner shown in FIG. 7 for yieldably maintaining the valve 3 in the position thereof shown in FIG. 7 where the cam 33 has opened the non-return valve 7, 8 so that the piston 10 is returning to its starting position. In the same way, when the handle 3' has been turned in the direction of the arrow 21, so as to introduce fluid under pressure into the cylinder 2, the upper rib 37' of FIGS. 6 and 7 will snap over the upper edge of the valve member 3 to yieldably hold the valve member 3 in the position of the latter where the passage 9" is closed by the valve portion 35 of the valve member 3, as described above.

It will be understood that each of the elements described above, or two or more together, may also find a useful application in other types of hydraulic devices differing from the types described above.

While the invention has been illustrated and described as embodied in hydraulic power assemblies, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a hydraulic power assembly, in combination, a crank case filled with hydraulic fluid; a cylinder communicating with said case; a piston slidable in said cylinder; crank means in said case operatively connected with said piston to be actuated by movement of the latter in said cylinder; conduit means communicating with said crank case and leading fom the latter to the interior of said cylinder at a working end thereof located at the side of said piston directed away from said crank case; first valve means connected to and communicating with said conduit means and non-return valve means located between and communicating with said first valve means and said working end of said cylinder, said first valve means being movable from a neutral position in one direction for directing fluid under pressure into said working end of said cylinder for moving said piston toward said crank case to actuate said crank means, said non-return valve means being opened by the fluid under pressure to admit fluid into said working end of said cylinder when said first valve means is moved in said one direction from said neutral position thereof, said first valve means being movable from said neutral position thereof in an opposite direction for returning the fluid under pressure back to a reservoir and for opening said non-return valve means to free said piston for movement away from said crank case for advancing the fluid along said conduit means from the working end of said cylinder back to said crank case; and blocking valve means operatively connected to said first valve means to be actuated thereby and communicating with said conduit means for blocking the latter when said first valve means is in its neutral position to prevent movement of said piston when said first valve means is in said neutral position thereof.

2. In a hydraulic power assembly, in combination, a crank case filled with hydraulic fluid; a cylinder communicating with said case; a piston slidable in said cylinder; crank means in said case operatively connected with said piston to be actuated by movement of the latter in said cylinder; conduit means communicating with said crank case and leading from the latter to the interior of said cylinder at a working end thereof located at the side of said piston directed away from said crank case; first valve means connected to and communicating with said conduit means and non-return valve means located between and communicating with said first valve means and said working end of said cylinder, said first valve means being movable from a neutral position in one direction for directing fluid under pressure into said working end of said cylinder for moving said piston toward said crank case to actuate said crank means, said non-return valve means being opened by the fluid under pressure to admit fluid into said working end of said cylinder when said first valve means is moved in said one direction from said neutral position thereof, said first valve means being movable from said neutral position thereof in an opposite direction for returning the fluid under pressure back to a reservoir and for opening said non-return valve means to free said piston for movement away from said crank case for advancing the fluid along said conduit means from the working end of said cylinder back to said crank case; and blocking valve means operatively connected to said first valve means to be actuated thereby and communicating with said conduit means for blocking the latter when said first valve means is in its neutral position to prevent movement of said piston when said first valve means is in said neutral position thereof, both of said valve means being integrally connected to each other and forming a single unit.

3. In a hydraulic power assembly, in combination, an elongated cylinder having a working end and a crank end opposite from said working end thereof; a piston slidable in said cylinder; a valve housing fixed to said cylinder at said working end thereof; non-return valve means at said working end of said cylinder preventing fluid from flowing from said working end of said cylinder to said valve housing when said non-return valve means is closed; conduit means communicating with and leading from said crank end of said cylinder to said valve housing and communicating with the interior of the latter; and elongated rotary valve means supported for turning movement about its axis in said valve housing, said rotary valve means having a first portion cooperating with said working end of said cylinder for introducing fluid under pressure at least great enough to open said non-return valve means into said working end of said cylinder for moving the piston toward the crank end of said cylinder when said rotary valve means is turned in one direction from a neutral angular position and for releasing fluid from the working end of said cylinder to flow back along said conduit means to said crank end of said cylinder when said rotary valve means is turned in an opposite direction from said neutral position thereof to a position where said rotary valve means opens said non-return valve means, said rotary valve means having a second position spaced axially from said first portion thereof and cooperating with said conduit means for blocking the latter when said rotary valve means is in said neutral position thereof so as to lock the piston in whatever position it happens to be when said rotary valve means is placed in its neutral position.

4. In a hydraulic power assembly, in combination, an elongated cylinder having a working end and a crank end opposite from said working end thereof; a piston slidable in said cylinder; a valve housing fixed to said cylinder at said working end thereof; conduit means communicating with and leading from said crank end of said cylinder to said valve housing and communicating with the interior of the latter; elongated rotary valve means supported for turning movement about its axis in said valve housing and non-return valve means located between and communicating with said rotary valve means and said working end of said cylinder, said rotary valve means having a first portion cooperating with said non-return valve means for opening the latter and introducing fluid, derived from said crank end of said cylinder through said conduit means, into said working end of said cylinder for moving the piston toward the crank end of said cylinder when said rotary valve means is turned in one direction from a neutral angular position and for releasing fluid from the working end of said cylinder to flow back along said conduit means to said crank end of said cylinder when said rotary valve means is turned in an opposite direction from said neutral position thereof, said rotary valve means having a second portion spaced axially from said first portion thereof and cooperating with said conduit means for blocking the latter when said rotary valve means is in said neutral position thereof so as to lock the piston in whatever position it happens to be when said rotary valve means is placed in its neutral position, said rotary valve means being axially shiftable in said housing from a first operating position where said first and second portions of said rotary valve means respectively cooperate with said non-return valve means and said conduit means, to a second operating position where a third portion of said rotary valve means axially spaced from said first and second portions thereof also cooperates with said conduit means to block the same while the rotary valve means turns about its axis so that in its second operating position said roary valve means may be actuated to control other hydraulic structure while maintaining the piston blocked in said cylinder.

5. In a hydraulic power assembly, in combination, an elongated cylinder having a working end and a crank end opposite from said working end thereof; a piston slidable in said cylinder; a valve housing fixed to said cylinder at said working end thereof; conduit means communicating with and leading from said crank end of said cylinder to said valve housing and communicating with the interior of the latter; elongated rotary valve means supported for turning movement about its axis in said valve housing and non-return valve means located between and communicating with said rotary valve means and said working end of said cylinder, said rotary valve means having a first portion cooperating with non-return valve means for opening the latter and introducing fluid, derived from said crank end of said cylinder through said conduit means, into said working end of said cylinder for moving the piston toward the crank end of said cylinder when said rotary valve means is turned in one direction from a neutral angular position and for releasing fluid from the working end of said cylinder to flow back along said conduit means to said crank end of said cylinder when said rotary valve means is turned in an opposite direction from said neutral position thereof, said rotary valve means having a second portion spaced axially from said first portion thereof and cooperating with said conduit means for blocking the latter when said rotary valve means is in said neutral position thereof so as to lock the piston in whatever position it happens to be when said rotary valve means is placed in its neutral position, said rotary valve means being axially shiftable in said housing from a first operating position where said first and second portions of said rotary valve means respectively cooperate with said non-return valve means and said conduit means, to a second operating position where a third portion of said rotary valve means axially spaced from said first and second portions thereof also cooperates with said conduit means to block the same while the rotary valve means turns about its axis so that in its second operating position said rotary valve means may be actuated to control other hydraulic structure while maintaining the piston blocked in said cylinder; and means cooperating with said rotary valve means for releasably holding the same in said first and second operating position thereof.

6. In a hydraulic power assembly, in combination, a crank case filled with hydraulic fluid; a cylinder communicating with said case; a piston slidable in said cylinder; crank means in said case operatively connected with said piston to be actuated by movement of the latter in said cylinder; conduit means communicating with said crank case and leading from the latter to the interior of said cylinder at a working end thereof located at the side of said piston directed away from said crank case; first valve means connected to and communicating with said conduit means and non-return valve means located between and communicating with said first valve means and said working end of said cylinder, said first valve means being movable from a neutral position in one direction for directing fluid under pressure into said working end of said cylinder for moving said piston toward said crank case to actuate said crank means, said non-return valve means being opened by the fluid under pressure to admit fluid into said working end of said cylinder when said first valve means is moved in said one direction from said neutral position thereof, said first valve means being movable from said neutral position thereof in an opposite direction for returning the fluid under pressure back to a reservoir and for opening said non-return valve means to free said piston for movement away from said crank case for advancing the fluid along said conduit means from the working end of said cylinder back to said crank case; blocking valve means operatively connected to said first valve means to be actuated thereby and communicating with said conduit means for blocking the latter when said first valve means is in its neutral position to prevent movement of said piston when said first valve means is in said neutral position thereof; and means connected to said crank means and cooperating with said first valve means for automatically placing the latter in said neutral position thereof when said piston reaches an end of its stroke.

7. In a hydraulic power assembly, in combination, a crank case filled with hydraulic fluid; a cylinder communicating with said case; a piston slidable in said cylinder; crank means in said case operatively connected with said piston to be actuated by movement of the latter in said cylinder; conduit means communicating with said crank case and leading from the latter to the interior of said cylinder at a working end thereof located at the side of said piston directed away from said crank case; first valve means connected to and communicating with said conduit means and non-return valve means located between and communicating with said first valve means and said working end of said cylinder, said first valve means being movable from a neutral position in one direction for directing fluid under pressure into said working end of said cylinder for moving said piston toward said crank case to actuate said crank means, said non-return valve means being opened by the fluid under pressure to admit fluid into said working end of said cylinder when said first valve means is moved in said one direction from said neutral position thereof, said first valve means being movable from said neutral position thereof in an opposite direction for returning the fluid under pressure back to a reservoir and for opening said non-return valve means to free said piston for movement away from said crank case for advancing the fluid along said conduit means from the working end of said cylinder back to said crank case; and blocking valve means operatively connected to said first valve means to be actuated thereby and communicating with said conduit means for blocking the latter when said first valve means is in its neutral position to prevent movement of said piston when said first valve means is in said neutral position thereof, said crank case having substantially the configuration of part of a sphere so as to be capable of withstanding high pressures of the hydraulic fluid therein.

References Cited in the file of this patent

UNITED STATES PATENTS

| | | |
|---|---|---|
| 1,353,244 | Joerns | Sept. 21, 1920 |
| 1,974,657 | Rodler | Sept. 25, 1934 |
| 2,094,466 | Proctor | Sept. 28, 1937 |
| 2,243,364 | Trautman | May 27, 1941 |
| 2,360,987 | Temple | Oct. 24, 1944 |
| 2,477,710 | Worstell | Aug. 2, 1949 |
| 2,615,429 | Jacques | Oct. 28, 1952 |
| 2,728,353 | Bonham | Dec. 27, 1955 |

FOREIGN PATENTS

| | | |
|---|---|---|
| 1,091,518 | France | Oct. 27, 1954 |